United States Patent
Råbe et al.

(10) Patent No.: US 12,459,691 B2
(45) Date of Patent: Nov. 4, 2025

(54) METHOD FOR TRANSVERSALLY SEALING A TUBE OF PACKAGING MATERIAL USING AN ULTRASONIC SEALING DEVICE, AN ANVIL AND AN ULTRA-SONIC SEALING DEVICE

(71) Applicant: TETRA LAVAL HOLDINGS & FINANCE S.A., Pully (CH)

(72) Inventors: Magnus Råbe, Åkarp (SE); Magnus Lindvall, Lund (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 124 days.

(21) Appl. No.: 18/246,422

(22) PCT Filed: Sep. 29, 2021

(86) PCT No.: PCT/EP2021/076729
§ 371 (c)(1),
(2) Date: Mar. 23, 2023

(87) PCT Pub. No.: WO2022/069508
PCT Pub. Date: Apr. 7, 2022

(65) Prior Publication Data
US 2023/0356872 A1    Nov. 9, 2023

(30) Foreign Application Priority Data
Oct. 1, 2020  (EP) ..................... 20199496

(51) Int. Cl.
*B65B 51/22*   (2006.01)
*B29C 65/00*   (2006.01)
(Continued)

(52) U.S. Cl.
CPC ............ *B65B 51/225* (2013.01); *B29C 65/08* (2013.01); *B29C 66/1122* (2013.01);
(Continued)

(58) Field of Classification Search
CPC ....... B65B 51/225; B65B 51/30; B65B 61/24; B65B 2051/105; B65B 51/144;
(Continued)

(56) References Cited

U.S. PATENT DOCUMENTS

| | | | |
|---|---|---|---|
| 6,986,232 B1* | 1/2006 | Kume | ................ B29C 66/4322 |
| | | | 53/DIG. 2 |
| 2008/0110560 A1* | 5/2008 | Wijk | ..................... B29C 66/723 |
| | | | 156/272.4 |
| 2019/0202587 A1 | 7/2019 | Yuhara | |

FOREIGN PATENT DOCUMENTS

| | | | | |
|---|---|---|---|---|
| EP | 1066951 A2 | 1/2001 | | |
| EP | 2727848 A1 * | 5/2014 | ............. | B29C 65/08 |
| WO | 2006041377 A1 | 4/2006 | | |

OTHER PUBLICATIONS

International Search Report (PCT/ISA/210) and Written Opinion (PCT/ISA/237) mailed on Dec. 10, 2021, by the European Patent Office as the International Searching Authority for International Application No. PCT/EP2021/076729. (10 pages).

* cited by examiner

*Primary Examiner* — John L Goff, II
(74) *Attorney, Agent, or Firm* — BUCHANAN INGERSOLL & ROONEY PC

(57) ABSTRACT

A method for transversally sealing a packaging material tube, comprises placing a transversal sealing section of the tube between a sonotrode and an anvil. The transversal sealing section comprises a first two-layer sub-section, a three-layer sub-section and a second two-layer sub-section, transmitting ultrasonic acoustic vibrations, having a frequency and an amplitude, from the sonotrode into the transversal sealing section, thereby melting the plastic foil in the transversal sealing section, and pressing the tube together between the sonotrode and the anvil to bond the (Continued)

plastic foil such that transversal sealing is formed. The anvil has a ridge comprising various sub-sections for receiving various ones of the sub-sections of the tube, wherein the ridge has equal height in at least some of the sub-sections. The frequency, amplitude, pressure and paperboard properties are chosen to achieve equal temperature in the first two-layer sub-section, the three-layer sub-section and the second two-layer sub-section.

13 Claims, 5 Drawing Sheets

(51) Int. Cl.
  *B29C 65/08*    (2006.01)
  *B65B 51/14*    (2006.01)
  *B65B 51/30*    (2006.01)
  *B65B 61/24*    (2006.01)
  *B65B 51/10*    (2006.01)

(52) U.S. Cl.
  CPC .... *B29C 66/4312* (2013.01); *B29C 66/72328* (2013.01); *B29C 66/81427* (2013.01); *B29C 66/81431* (2013.01); *B29C 66/849* (2013.01); *B29C 66/91411* (2013.01); *B29C 66/9241* (2013.01); *B29C 66/92451* (2013.01); *B29C 66/9292* (2013.01); *B29C 66/944* (2013.01); *B29C 66/949* (2013.01); *B29C 66/9512* (2013.01); *B29C 66/9513* (2013.01); *B29C 66/9516* (2013.01); *B29C 66/9517* (2013.01); *B65B 51/144* (2013.01); *B65B 51/30* (2013.01); *B65B 61/24* (2013.01); *B65B 2051/105* (2013.01)

(58) Field of Classification Search
  CPC ... B32B 2310/028; B23K 20/10; B31F 5/008; B29C 65/08; B29C 66/951; B29C 66/8491; B29C 66/851; B29C 66/8511; B29C 66/1122; B29C 66/4312; B29C 66/849; B29C 66/91411; B29C 66/9241; B29C 66/92451; B29C 66/9292; B29C 66/944; B29C 66/949; B29C 66/9512; B29C 66/9513; B29C 66/9516; B29C 66/9517; B29C 66/346; B29C 66/29; B29C 66/72328; B29C 66/81431
  USPC .................................. 156/73.1, 73.3, 580.2
See application file for complete search history.

METHOD FOR TRANSVERSALLY SEALING A TUBE OF PACKAGING MATERIAL USING AN ULTRASONIC SEALING DEVICE, AN ANVIL AND AN ULTRA-SONIC SEALING DEVICE

TECHNICAL FIELD

The invention relates to ultrasonic sealing technology, also referred to as ultrasonic welding technology. In particular it is related to a method for transversally sealing a tube of packaging material using an ultrasonic sealing device, an anvil for the ultrasonic sealing device as well as the ultrasonic sealing device.

BACKGROUND ART

Using ultrasonic sealing technology, sometimes referred to as ultrasonic welding technology, in the food packaging industry is well known. For roll-fed carton packaging machines, the technology can be used for forming transversal sealings, that is, welds in a lower part of a tube of packaging material filled with food product such that packages can be formed. An advantage with using the ultrasonic sealing technology compared to induction sealing technology, sometimes referred to as induction heating technology, is that the ultrasonic sealing technology can be used also for packaging materials not containing an Aluminum layer or other electrically conductive material.

For many roll-fed carton packaging machines, the packaging material is provided in the form of a web rolled up on a reel. Forming the tube can comprise the steps; unwinding the packaging material from the reel, sterilizing the packaging material such that unwanted microorganisms are removed, directing the web such that an overlap between a first side section and a second side section of the web is formed, and sealing the first and second side sections together. In this way, the overlap comprises two layers of packaging material and a remainder of the tube comprises one layer of packaging material.

The overlap formed during the longitudinal sealing has an effect on the transversal sealing. During the transversal sealing, the tube is pressed together between a sonotrode and an anvil of an ultrasonic sealing device. Due to the longitudinal sealing, the ultrasonic sealing device has to be designed to handle two layers of packaging material as well as three layers of packaging material. If three layers of packaging material are present more energy is needed for achieving a reliable transversal sealing compared to if two layers are present.

The challenge with handling two and three layers of packaging material in the ultrasonic sealing device for forming the transversal sealings is made more complicated in that the overlap, caused by the longitudinal sealing, may deviate in position over time. This is today solved by having so-called transition sections in the ultrasonic sealing device in which both two and three layers of packaging material can be handled sufficiently, but not optimally.

Even though there are solutions available today for handling two and three layers of packaging material in the ultrasonic sealing device, there is a need to further improve such that more reliable transversal sealings generated by the ultrasonic sealing device from a tube of packaging material comprising the overlap caused by the longitudinal sealing.

SUMMARY

It is an object of the invention to at least partly overcome one or more of the above-identified limitations of the prior art. In particular, it is an object to provide more reliable, robust and cost-efficient transversal sealing in carton-based packaging machines.

Generally, it has been realized that by choosing parameter values for the sonotrode wisely equal temperature can be achieved in both two-layer sub-sections and three-layer sub-sections. This provides for that an uncompensated ridge can be used, which in turn implies improved robustness, less overheating and reduced cooling time and cycle time.

According to a first aspect it is provided a method for transversally sealing a tube of packaging material using an ultrasonic sealing device, wherein the packaging material may comprise a paperboard and a plastic foil attached to the paperboard, wherein the plastic foil may face inwards and the tube may comprise a longitudinal sealing in which two layers of packaging material are placed on top of each other, said method comprising placing a transversal sealing section of the tube between a sonotrode and an anvil comprising a ridge, wherein the transversal sealing section of the tube may comprise a first two-layer sub-section, a three-layer sub-section and a second two-layer sub-section, transmitting ultrasonic acoustic vibrations, having a frequency and an amplitude, from the sonotrode into the transversal sealing section, thereby causing heat generation in the paperboard in turn causing the plastic foil in the transversal sealing section to melt, and pressing the tube together between the sonotrode and the anvil by a pressure, thereby resulting in that the plastic foil of the transversal sealing section bond such that a transversal sealing is formed, wherein the ridge of the anvil may comprise a first two-layer sub-section for receiving the first two-layer sub-section of the tube, a first two-or-three layer sub-section for receiving the first two-layer sub-section or the three-layer sub-section of the tube, a three-layer-sub-section for receiving the three-layer sub-section of the tube, a second two-or-three layer sub-section for receiving the three-layer sub-section or the second two-layer sub-section of the tube, and a second two-layer sub-section for receiving the second two-layer sub-section of the tube, wherein the ridge may have equal height in the first two-layer sub-section, the first two-or-three layer sub-section, the second two-or-three layer sub-section and the second two-layer sub-section, wherein a combination of the frequency, the amplitude, the pressure and properties of the paperboard may be chosen such that equal temperature in the first two-layer sub-section, the three-layer sub-section and the second two-layer sub-section of the tube is achieved.

The combination may be chosen such that that work per cycle ($W_{3layers}$) for the three-layer sub-section of the transversal sealing section equals 3/2 work per cycle ($W_{2layers}$) for the first two-layer sub-section or the second two-layer sub-section of the transversal sealing section.

The combination of the frequency, the amplitude, the pressure and the properties of the packaging material can be used for reshaping and repositioning an adjusted two-layer hysteresis loop and an adjusted three-layer hysteresis loop in a viscous network of the paperboard.

The method may further comprise
tuning heat generation in the first two-layer section and the second two-layer section of the transversal sealing section by controlling a dissipative area fraction of the adjusted two-layer hysteresis loop by continuously amending the amplitude.

The frequency may be 20-50 kHz, such as 29 kHz.

The pressure, such as a static pressure at a ridge/sealing location, may be above 20 MPa.

The amplitude may be 8-24 micrometer.

The ultrasonic acoustic vibrations may be transmitted into the transversal sealing section for 15-130 ms.

According to a second aspect it is provided an anvil for an ultrasonic sealing device for transversally sealing a tube of packaging material using an ultrasonic sealing device, wherein the packaging material may comprise a paperboard and a plastic foil attached to the paperboard, wherein the plastic foil may face inwards and the tube may comprise a longitudinal sealing in which two layers of packaging material are placed on top of each other, said anvil comprising a ridge comprising a first two-layer sub-section for receiving the first two-layer sub-section of the tube, a first two-or-three layer sub-section for receiving the first two-layer sub-section or the three-layer sub-section of the tube, a three-layer-sub-section for receiving the three-layer sub-section of the tube, a second two-or-three layer sub-section for receiving the three-layer sub-section or the second two-layer sub-section of the tube, and a second two-layer sub-section for receiving the second two-layer sub-section of the tube, wherein the ridge may have equal height in the first two-layer sub-section, the first two-or-three layer sub-section, the second two-or-three layer sub-section and the second two-layer sub-section.

According to a third aspect it is provided an ultrasonic sealing device for transversally sealing a tube of packaging material, wherein the packaging material may comprise a paperboard and a plastic foil attached to the paperboard, wherein the tube may comprise a longitudinal sealing in which two layers of packaging material are placed on top of each other and the plastic foil may be facing inwards, said ultrasonic sealing device comprising a sonotrode arranged to transmit ultrasonic acoustic vibrations, having a frequency and an amplitude, into a transversal sealing section of the tube, thereby causing heat generation in the paperboard in turn causing the plastic foil in the transversal sealing section to melt, wherein the transversal sealing section may comprise a first two-layer sub-section, a three-layer sub-section and a second two-layer sub-section, an anvil placed opposite to the sonotrode, wherein the ridge may comprise a first two-layer sub-section for receiving the first two-layer sub-section of the tube, a first two-or-three layer sub-section for receiving the first two-layer sub-section or the three-layer sub-section of the tube, a three-layer sub-section for receiving the three-layer sub-section of the tube, a second two-or-three layer sub-section for receiving the three-layer sub-section or the second two-layer sub-section of the tube, and a second two-layer sub-section for receiving the second two-layer sub-section of the tube, wherein the ridge may have equal height in the first two-layer sub-section, the first two-or-three layer sub-section, the second two-or-three layer sub-section and the second two-layer sub-section, wherein a combination of the frequency, the amplitude, the pressure and properties of the paperboard is chosen such that equal temperature in the first two-layer sub-section, the three-layer sub-section and the second two-layer sub-section of the tube is achieved.

The combination may be chosen such that that work per cycle ($W_{3layers}$) for the three-layer sub-section of the transversal sealing section equals 3/2 work per cycle ($W_{2layers}$) for the first two-layer sub-section or the second two-layer sub-section of the transversal sealing section.

The combination of the frequency, the amplitude, the pressure and the properties of the packaging material may be used for reshaping and repositioning a two-layer hysteresis loop and a three-layer hysteresis loop in a viscous network of the paperboard.

The device may further comprise a control unit configured to tune heat generation in the first two-layer section and the second two-layer section by controlling a dissipative area fraction of the adjusted two-layer hysteresis loop by continuously amending the amplitude.

The frequency may be 20-50 kHz, such as 29 kHz.

The amplitude may be 8-24 micrometer.

Still other objectives, features, aspects and advantages of the invention will appear from the following detailed description as well as from the drawings.

BRIEF DESCRIPTION OF THE DRAWINGS

Embodiments of the invention will now be described, by way of example, with reference to the accompanying schematic drawings, in which.

DETAILED DESCRIPTION

Figure 1:
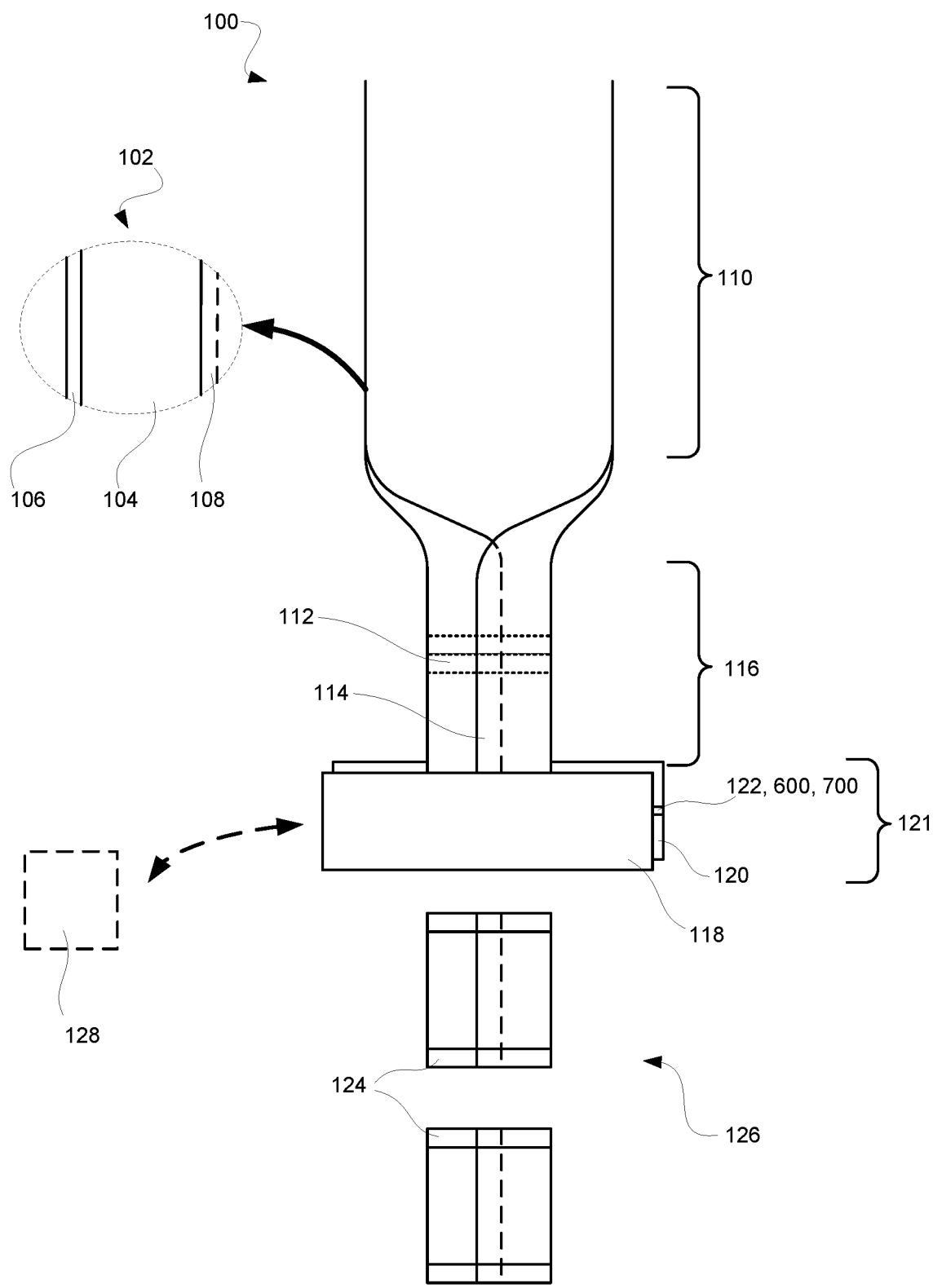
FIG. 1 illustrates a general principle of a roll-fed carton packaging machine.

FIG. 1 illustrates the general principle of a roll-fed packaging machine 100 by way of example. In this example it is provided a packaging material 102 comprising a paperboard 104 and a plastic foil 106 attached to the paperboard 104. The plastic foil 106 provides a barrier between a product, such as milk or orange juice, and the paperboard 104. Optionally, to protect print on the paperboard 104 and to protect from surrounding moisture, an outer plastic foil 108 may be attached to an outside of the paperboard 104.

Most often the packaging material 102 is provided to the packaging machine 100 on a reel (not illustrated). When the packaging material 102 is unwound from the reel, a web 110 of packaging material 102 is formed. The web 110 may comprise transversal sealing sections 112, that is, sections in the packaging material 102 intended to be sealed together, sometimes referred to as welded together. Before this, a longitudinal sealing 114 is formed by e.g. overlapping a first side section of the web over a second side section and sealing these together. As an effect of forming the longitudinal sealing 114, a tube 116 is formed. The tube 116 may be filled with product such that the tube 116 can be transversally sealed when the product is held in the tube 116.

In a lower end of the tube 116, a sonotrode 118 and an anvil 120 can be provided. Herein, the two are referred to as an ultrasonic sealing device 121. As illustrated, the anvil 120 can be provided with a ridge 122, 600, 700. The ridge 122, 600, 700 is illustrated in further detail in FIGS. 2a, 2b, 2c, 3, 6 and 7.

Generally, the sonotrode 118 transmits vibroacoustic waves that causes heat generation in the paperboard 104, thereby resulting in that the plastic foil 106 melts. By applying a pressure on two opposite sides of the tube 116, the plastic foil 106 on the two sides bond to each other and transversal sealings 124 are formed. A knife (not illustrated) can be used for cutting apart the transversal sealings such that a bottom of one package and a top of another package can be formed. Packages 126 formed in this way during the transversal sealing may thereafter continue to a folding apparatus (not illustrated) in which e.g. the packages 126 are formed into brick-shaped packages.

As illustrated, a control unit 128 communicatively connected to the ultrasonic sealing device 121 may be provided. By having this, frequency (f), amplitude (A) and pressure (P) may be amended such that e.g. equal temperature can be provided in all section of the transversal sealings 124, and not for instance higher temperature in the section of the transversal sealing in which the longitudinal sealing 114 is provided compared to the sections in which the longitudinal sealing 114 is not provided.

Figure 2A:
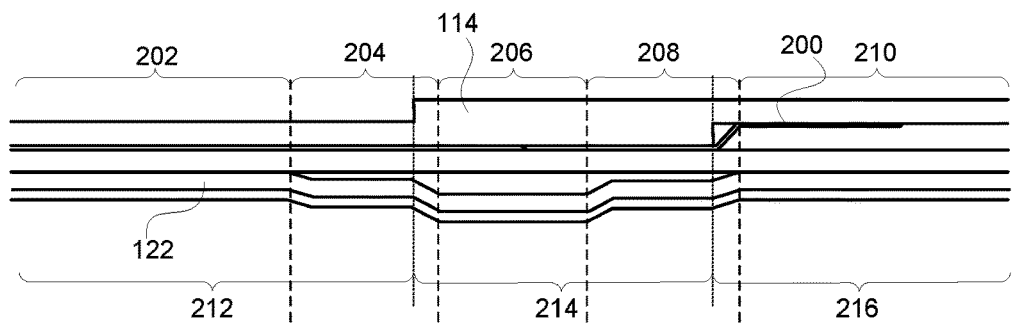
FIGS. 2a, 2b and 2c illustrate three different situations that may arise when using a compensated anvil.
Figure 2B:
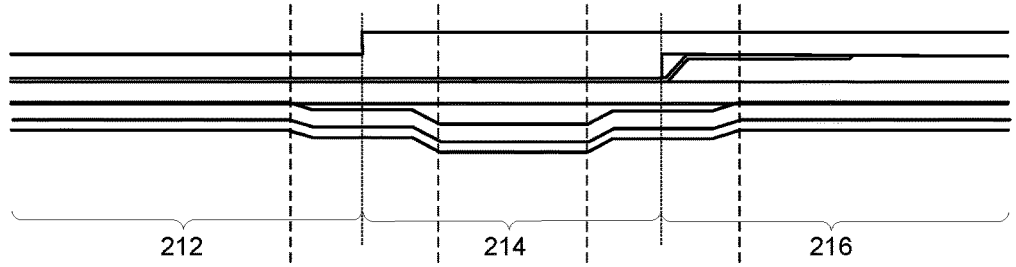
Figure 2C:
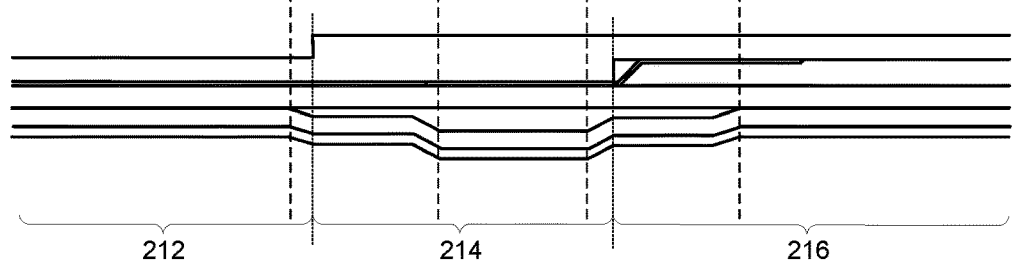

FIGS. 2a, 2b and 2c illustrate three different situations that may arise when using the anvil 120 provided with the ridge 122 having a deep center groove and two side grooves that are less deep. The reason for having the deep center groove is to compensate for the longitudinal sealing 114 in the tube 116 in which three layers of packaging material 102 are present. By having this deep center groove, a pressure suitable for three layers of the packaging material 102 can be provided. As an effect, a risk of damaging the packaging material 102 can be reduced.

The side grooves are provided for handling that a position of the longitudinal sealing 114 may vary. By having the side grooves, that are not as deep as the deep center groove, both three and two layers of packaging material 102 can be handled with sufficient results.

Herein, the different sections of the ridge 122 are referred to as a first two-layer sub-section 202, which is made to handle two layers of packaging material, a first two-or-three layer sub-section 204, which is made to sufficiently handle both two layers and three layers, a three-layer-sub-section 206, which is made to handle three layers, a second two-or-three layer sub-section 208, which is made to sufficiently handle two or three layers of packaging material 102, and a second three layer sub-section 210, which is made to handle two layers of packaging material.

As is illustrated in FIG. 2a, in which a first situation is provided by way of example, a first two-layer sub-section 212 of the tube 116 may interact with the first two-layer sub-section 202 and a main portion of the first two-or-three layer sub-section 204 of the ridge 122, a three-layer sub-section 214 of the tube 116 may interact with a minor portion of the first two-or-three layer sub-section 204, the three-layer sub-section 206 of the ridge 122 and a main portion of the second two-or-three layer sub-section 208 of the ridge 122, and a second two-layer sub-section 216 of the tube 116 may interact with a minor portion of the second two-or-three layer sub-section 208 of the ridge 122 and the two-layer sub-section 210 of the ridge 122.

FIG. 2b illustrates, by way of example, a second situation. Compared to the first situation illustrated in FIG. 2a, the three-layer sub-section 214 of the tube 116 is shifted left. In this way, the first two-layer sub-section 212 may interact with the two-layer sub-section 202 of the ridge 112 and approximately half of the first two-or-three layer sub-section 204 of the ridge 122. The three-layer sub-section 214 may interact with approximately half of the first two-or-three layer sub-section 204, the three-layer sub-section 206 and approximately half of the second two-or-three layer sub-section 208 of the ridge 122. The second two-layer sub-section 216 may interact with approximately half of the second two-or-three layer sub-section 208 and the second two layer sub-section 210.

As illustrated in FIG. 2c, in a third situation, also presented by way of example, the three layer sub-section 214 may be even more shifted left. As an effect, the first two-layer sub-section 212 may interact with the first two-layer sub-section 202 of the ridge 122 and a minor portion of the first two-or-three layer sub-section 204. The three-layer sub-section 214 may interact with a major portion of the first three-layer sub-section 204 of the ridge, the three-layer sub-section 206 and a minor portion of the second two-or-three layer sub-section 208 of eth ridge 122. The second two-layer sub-section 216 may interact with a major portion of the second two-or-three layer sub-section 208 of the ridge 122 and the second two-layer sub-section 210.

As mentioned above, the first and second two-or-three layer sub-sections 204, 208 provide for that both the first and second two-layer sub-sections 212, 216 as well as the three layer sub-section 214 can be handled. However, since the first and second two-or-three layer sub-sections 204, 208 are made to handle both the results may be sufficient, but not as good as when handling e.g. the first two-layer sub-section 212 of the tube by the first two-layer sub-section 202 of the ridge 122 or the three layer sub-section 214 of the tube 116 by the three-layer sub-section 206 of the ridge 122.

Figure 3:
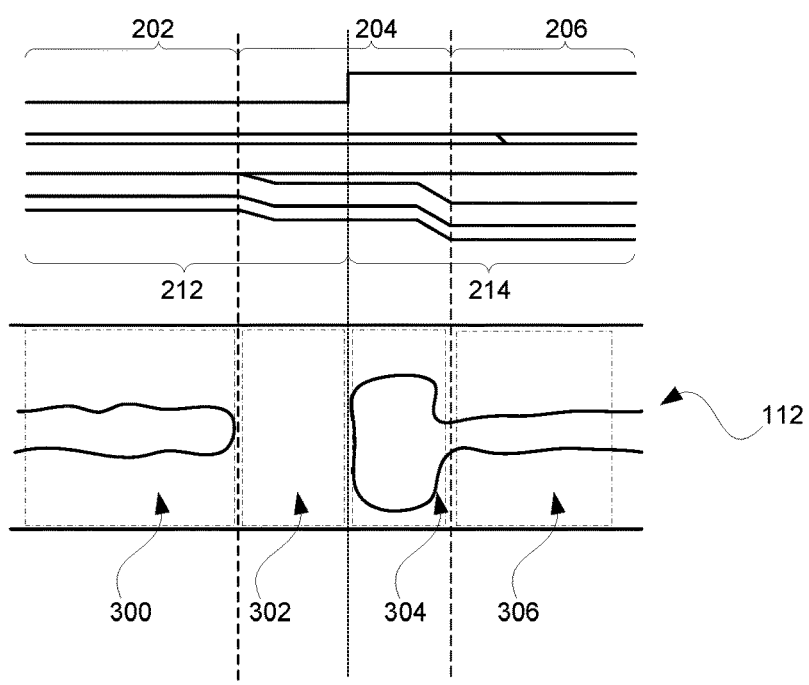
FIG. 3 illustrates, by way of example, how a transversal sealing section may be affected when using the compensated anvil of FIG. 2a-c.

FIG. 3 illustrates, by way of example, how the transversal sealing section 112 may be sealed by using the ridge 122. In a first area 300, the first two-layer sub-section 202 of the tube 116 has been sealed by the first two-layer sub-section 212 of the ridge 122, sometimes also referred to as an uncompensated ridge area. A sealing temperature in this first area 300 may reach an adequate temperature interval such that the plastic foil 106 adequately melts and a reliable sealing is achieved. In a second area 302 of the transversal sealing section 112, the first two-layer sub-section 212 of the tube is sealed by the two-or-three layer sub-section 204 of the ridge 122, underheating may occur, that is, the adequate temperature interval is not reached with the effect that an insufficient sealing in this second area 302 is achieved. In a third area 304, in with the three-layer sub-section 214 is sealed by the first two-or-three layer sub-section 204 of the ridge 122, overheating may instead be achieved, that is, the temperature is beyond the adequate temperature interval. A result of the overheating may be that the plastic foil 106 melts too much with the effect that sealing quality is lowered. Lastly, in a fourth area 306, the three-layer sub-section 214 of the tube 116 is sealed by the three-layer sub-section 206 of the ridge 122 with the result that the adequate temperature interval is reached and reliable sealing is achieved.

Figure 4:
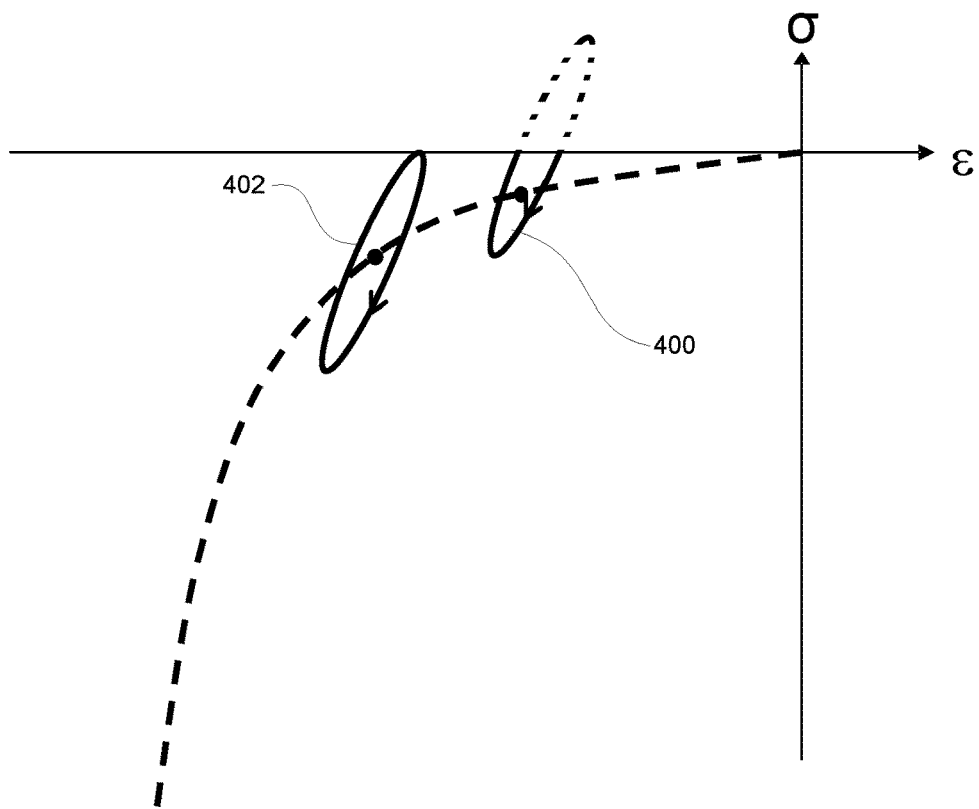
FIG. 4 illustrates a first and second dissipative hysteresis loop related to two- and three-layer sub-sections of the tube.

FIG. 4 illustrates a simple mechanical representation of the paperboard 104 under compression. A static network determines a static loading. A viscous network controls a response under high frequency oscillation. The ultrasonic sealing includes both mechanisms simultaneously and in parallel.

A desired heating effect in the ultrasonic sealing is based on a first dissipative hysteresis loop 400 in the viscous network of the paperboard 104 related to the first and second two-layer sub-sections 212, 216 of the tube 116 and a second dissipative hysteresis loop 402 related to the three-layer sub-section 214 of the tube 116 in a stress (a) vs nominal strain (E) diagram when using the ridge 122 as illustrated in FIGS. 2*a-c* and 3, as illustrated in FIG. 4. The energy (also referred to work (W)) induced in the packaging material 104, primarily the paperboard 102, by the first dissipative hysteresis loop 402 is truncated due to that the sonotrode 118 is jumping, that is, wasted potential energy. Put differently, a relatively low pressure on the first and second two-layer sub-sections 212, 216 in combination with a relatively high amplitude makes the sonotrode 118 jump in the air in part of the oscillation cycle, thereby missing out on potential heating.

Figure 5:
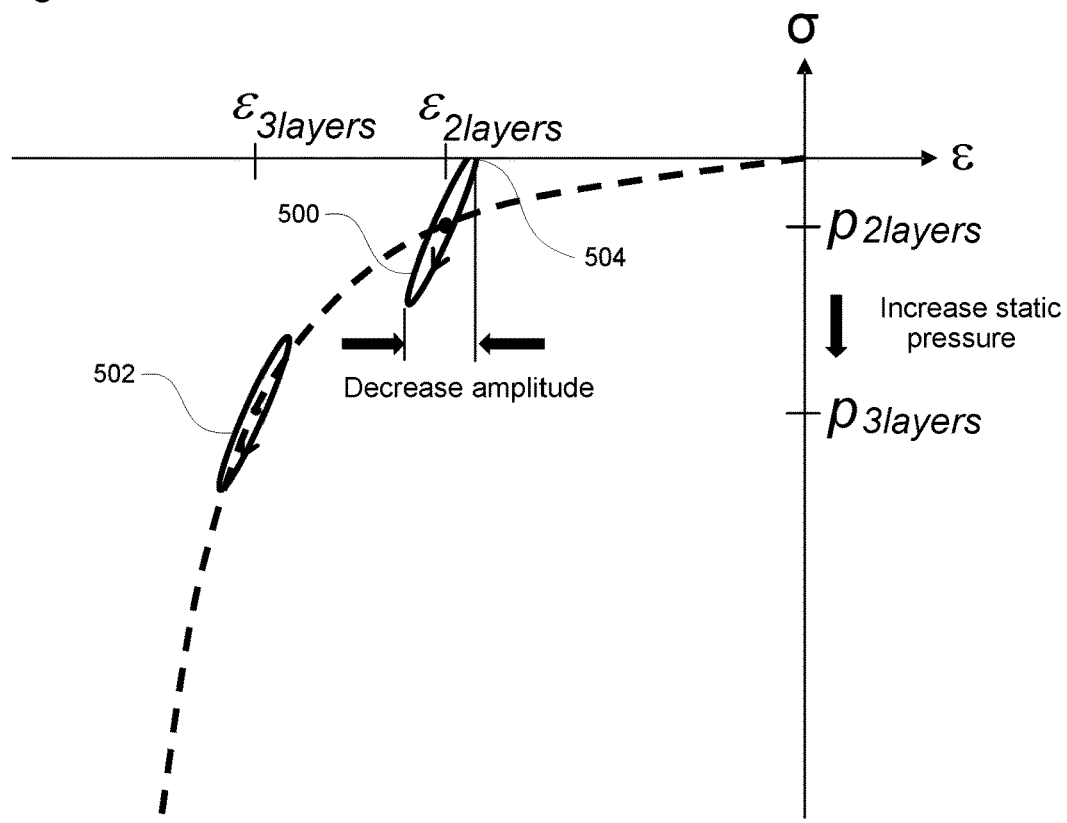
FIG. 5 illustrates a first and second compensated dissipative hysteresis loop related to two- and three-layer sub-sections of the tube.

As illustrated in FIG. 5, it has been found that by decreasing amplitude and increasing static pressure an adjusted two-layer hysteresis loop 500 related to the first and second two-layer sub-sections 212, 216 of the tube 116 and an adjusted three-layer hysteresis loop 502 related to the three-layer sub-section 214 of the tube 116 that appear in an uncompensated area, corresponding to the third area 304 can be moved deeper into a third quadrant of the stress (a) vs nominal strain (E) diagram. To compensate for the a smaller resulting hysteresis loop the frequency can be increased. By these amendments a combination of the amplitude, the static pressure, the frequency and the paperboard 104 can be made such that an equal temperature can be produced along an uncompensated ridge. This, in turn, provides for increased robustness, reduced risk of overheating while cooling time/cycle time can be reduced.

Optionally, heat generation in the first two-layer section 212 and the second two-layer section 214 of the transversal sealing section 112 can be tuned by controlling a dissipative area fraction 504 of the adjusted two-layer hysteresis loop 500 by e.g. continuously amending the amplitude A.

Figure 6:
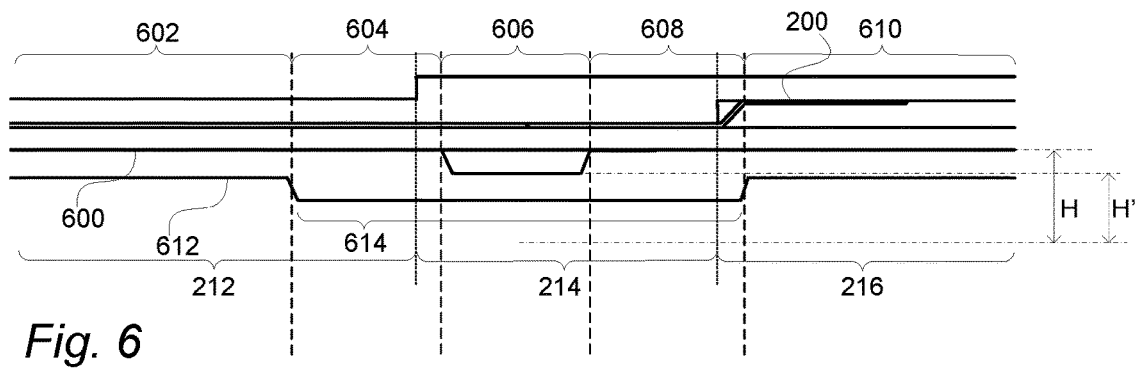
FIG. 6 illustrates a ridge that is uncompensated in a first two-layer sub-section, a first two-or-three layer sub-section, a second two-or-three layer sub-section and a second two-layer sub-section.

FIG. 6 illustrates a ridge 600 that is uncompensated in a first two-layer sub-section 602, a first two-or-three layer sub-section 604, a second two-or-three layer sub-section 608 and a second two-layer sub-section 610. Put differently, these sub-sections may have a height H. As explained above, by using the ridge 600 illustrated in FIG. 6 and choosing the frequency, the amplitude and the static pressure of the sonotrode 118, disadvantages related to the ridge 122 illustrated in FIG. 2*a-c* can be avoided. As illustrated, a three-layer sub-section 606 of the ridge 600 may be provided with a groove, that is, may have a different height H', which is less than the height H. A reason for having the groove may be to avoid damaging the packaging material 102.

A side section 612 may be provided with a groove 614 aligning with the first two-or-three layer sub-section 604, the three-layer sub-section 606 and the second two-or-three layer sub-section 608 as illustrated. An advantage with the groove 614 in the side section 612 is that damages caused by the side section 612 on the packaging material 102 can be avoided or at least reduced.

Figure 7:
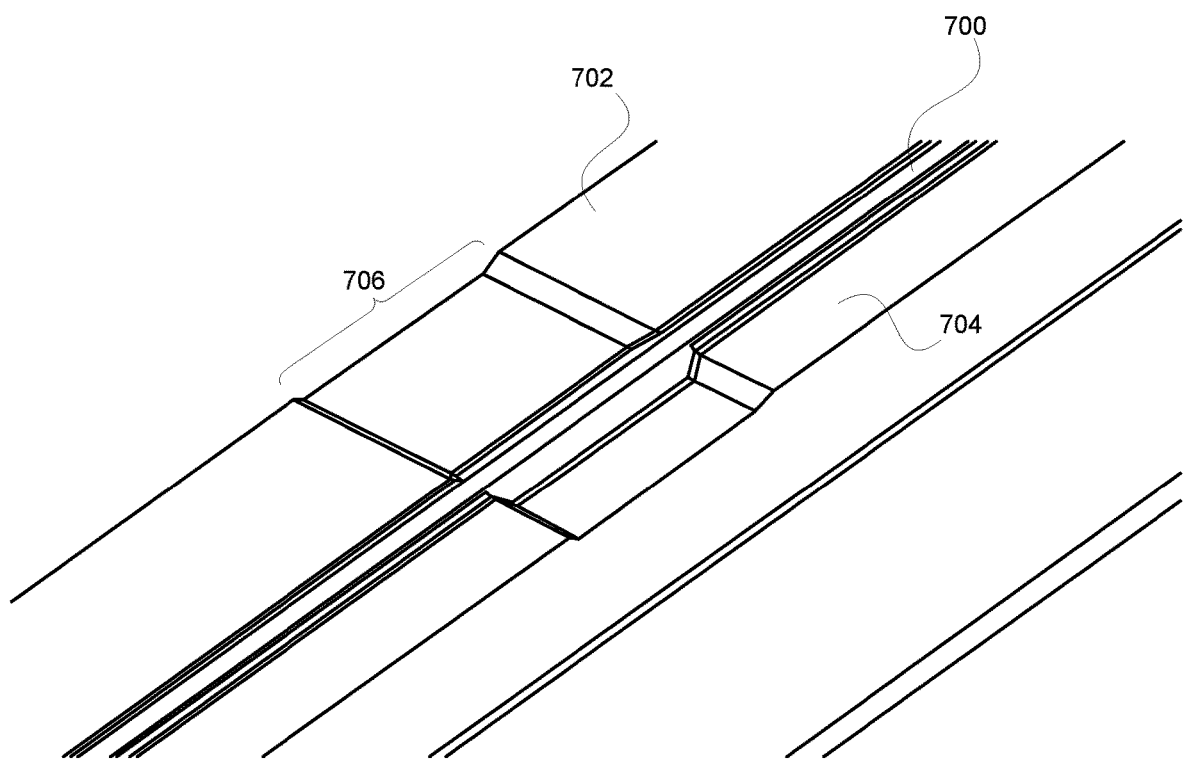
FIG. 7 illustrates a three-dimensional view of an uncompensated ridge.

FIG. 7 illustrates a ridge 700 that is uncompensated also in the three-layer sub-section. Similar to the side section 612 illustrated in FIG. 6, a first and a second side section 702, 704 placed next to the ridge 700 may be provided with a groove 706. An advantage with this groove 706 is that this may be placed such that three-layer sub-section 214 of the packaging material 102 interacts with this during the transversal sealing. By doing so, a risk of damaging the packaging material 102 can be reduced.

Figure 8:
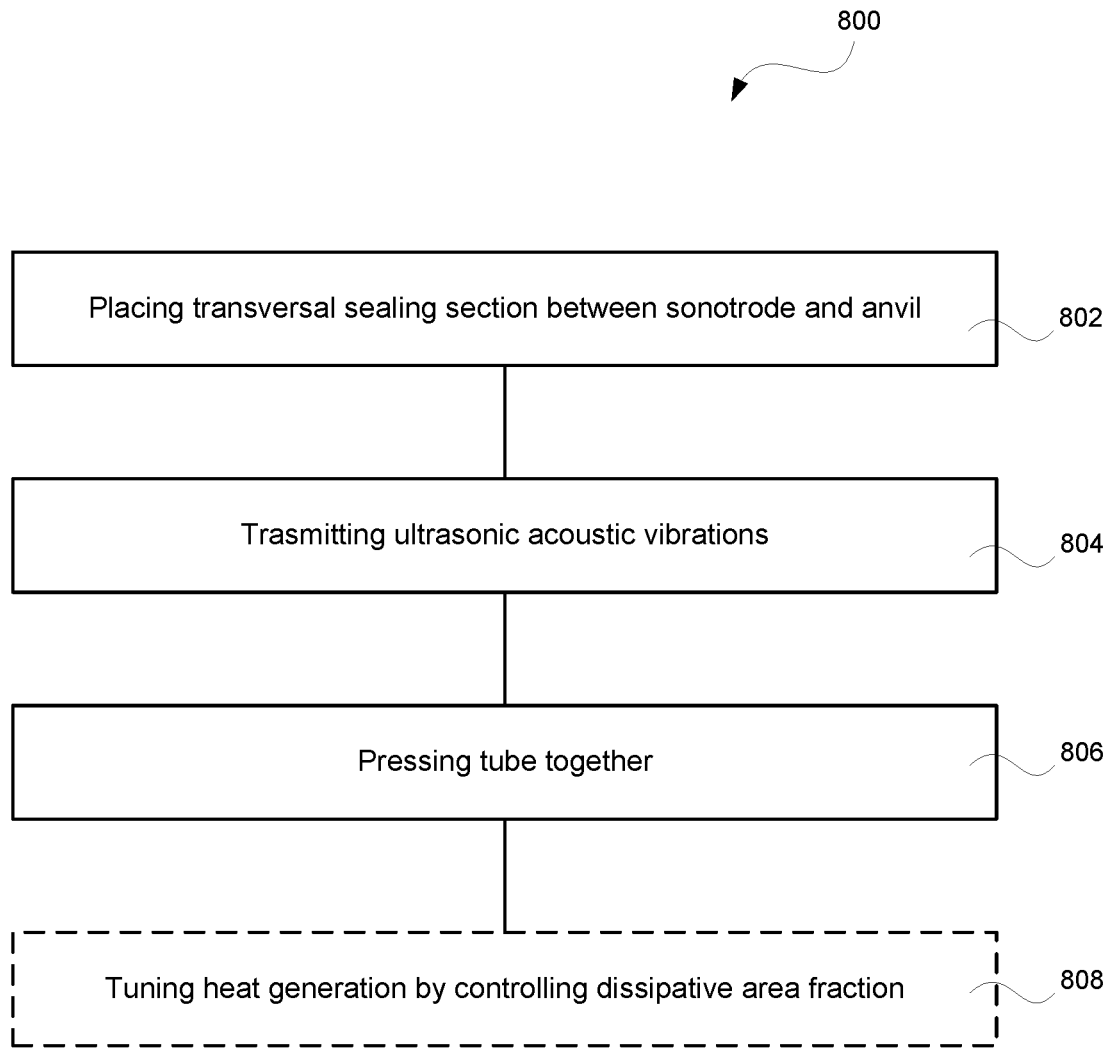
FIG. 8 is a flowchart generally illustrating steps of a method for transversally sealing a tube.

FIG. 8 is a flowchart generally illustrating steps of a method 800 for transversally sealing the tube 116. In a first step 802, the transversal sealing section 112 can be placed between the sonotrode 118 and the anvil 120. In a second step 804, ultrasonic acoustic vibrations can be transmitted from the sonotrode 118 into the transversal sealing section 112. In a third step 806, the tube 116 can be pressed between the sonotrode 118 and the anvil 120. Optionally, in a fourth step 808, heat generation in the first two-layer section 212 and the second two-layer section 214 of the transversal sealing section 112 can be tuned by controlling the dissipative area fraction 504 of the two-layer hysteresis loop.

Even though the general principle for the roll-fed packaging machine 100 is presented, the ultrasonic device 121 is not restricted to this kind of packaging machine, but can be used for different kinds of packaging machine with similar conditions. For instance, the ultrasonic sealing device 121 can be used in a blanks-fed packaging machine as well, that is a filling machine in which the packaging material 102 can be provided in the form of flat-folded pre-cut tube elements.

From the description above follows that, although various embodiments of the invention have been described and shown, the invention is not restricted thereto, but may also be embodied in other ways within the scope of the subject-matter defined in the following claims.

The invention claimed is:

1. A method for transversally sealing a tube of packaging material using an ultrasonic sealing device, wherein the packaging material comprises a paperboard and a plastic foil attached to the paperboard, wherein the plastic foil is facing inwards and the tube comprises a longitudinal sealing in which two layers of packaging material are placed on top of each other, said method comprising placing a transversal sealing section of the tube between a sonotrode and an anvil comprising a ridge, wherein the transversal sealing section of the tube comprises a first two-layer sub-section, a three-layer sub-section and a second two-layer sub-section, transmitting ultrasonic acoustic vibrations, having a frequency and an amplitude, from the sonotrode into the transversal sealing section, thereby causing heat generation in the paperboard in turn causing the plastic foil in the transversal sealing section to melt, and pressing the tube together between the sonotrode and the anvil by a pressure, thereby resulting in that the plastic foil of the transversal sealing section bond such that a transversal sealing is formed, wherein the ridge of the anvil comprises a first two-layer sub-section for receiving the first two-layer sub-section of the tube, a first two-or-three layer sub-section for receiving the first two-layer sub-section or the three-layer sub-section of the tube, a three-layer-sub-section for receiving the three-layer sub-section of the tube, a second two-or-three layer sub-section for receiving the three-layer sub-section or the second two-layer sub-section of the tube, and a second two-layer sub-section for receiving the second two-layer sub-section of the tube, wherein the ridge has equal height in the first two-layer sub-section, the first two-or-three-layer sub-section, the second two-or-three layer sub-section and the second two-layer sub-section, wherein a combination of the frequency, the amplitude, the pressure and properties of the paperboard is chosen for reshaping and repositioning an adjusted two-layer hysteresis loop and an adjusted three-layer hysteresis loop in a viscous network of the paperboard and such that equal temperature in the first two-layer sub-section, the three-layer sub-section and the second two-layer sub-section of the tube is achieved, and wherein the frequency is 20-30 KHz.

2. The method according to claim 1, wherein the combination is chosen such that that work per cycle for the three-layer sub-section of the transversal sealing section equals 3/2 work per cycle for the first two-layer sub-section or the second two-layer sub-section of the transversal sealing section.

3. The method according to claim 1, further comprising tuning heat generation in the first two-layer sub-section and the second two-layer sub-section of the transversal sealing section by controlling a dissipative area fraction of the adjusted two-layer hysteresis loop by continuously amending the amplitude.

4. The method according to claim 1, wherein the pressure is above 20 MPa.

5. The method according to claim 1, wherein the amplitude is 8-24 micrometer.

6. The method according to claim 1, wherein the ultrasonic acoustic vibrations are transmitted into the transversal sealing section for 15-130 ms.

7. The method according to claim 1, wherein the frequency is 29 KHz.

8. A method for transversally sealing a tube of packaging material using an ultrasonic sealing device, wherein the packaging material comprises a paperboard and a plastic foil attached to the paperboard, wherein the plastic foil is facing inwards and the tube comprises a longitudinal sealing in which two layers of packaging material are placed on top of each other, said method comprising placing a transversal sealing section of the tube between a sonotrode and an anvil comprising a ridge, wherein the transversal sealing section of the tube comprises a first two-layer sub-section, a three-layer sub-section and a second two-layer sub-section, transmitting ultrasonic acoustic vibrations, having a frequency and an amplitude, from the sonotrode into the transversal sealing section, thereby causing heat generation in the paperboard in turn causing the plastic foil in the transversal sealing section to melt, and pressing the tube together between the sonotrode and the anvil by a pressure, thereby resulting in that the plastic foil of the transversal sealing section bond such that a transversal sealing is formed, wherein the ridge of the anvil comprises a first two-layer sub-section for receiving the first two-layer sub-section of the tube, a first two-or-three layer sub-section for receiving the first two-layer sub-section or the three-layer sub-section of the tube, a three-layer-sub-section for receiving the three-layer sub-section of the tube, a second two-or-three layer sub-section for receiving the three-layer sub-section or the second two-layer sub-section of the tube, and a second two-layer sub-section for receiving the second two-layer sub-section of the tube, wherein the ridge has equal height in the first two-layer sub-section, the first two-or-three-layer sub-section, the second two-or-three layer sub-section and the second two-layer sub-section, wherein a combination of the frequency, the amplitude, the pressure and properties of the paperboard is chosen for reshaping and repositioning an adjusted two-layer hysteresis loop and an adjusted three-layer hysteresis loop in a viscous network of the paperboard and such that equal temperature in the first two-layer sub-section, the three-layer sub-section and the second two-layer sub-section of the tube is achieved, and wherein the frequency is 20-35 kHz.

9. The method according to claim 8, wherein the combination is chosen such that that work per cycle for the three-layer sub-section of the transversal sealing section equals 3/2 work per cycle for the first two-layer sub-section or the second two-layer sub-section of the transversal sealing section.

10. The method according to claim 8, further comprising tuning heat generation in the first two-layer sub-section and the second two-layer sub-section of the transversal sealing section by controlling a dissipative area fraction of the adjusted two-layer hysteresis loop by continuously amending the amplitude.

11. The method according to claim 8, wherein the pressure is above 20 MPa.

12. The method according to claim 8, wherein the amplitude is 8-24 micrometer.

13. The method according to claim 8, wherein the ultrasonic acoustic vibrations are transmitted into the transversal sealing section for 15-130 ms.

* * * * *